US012731586B2

(12) United States Patent
Brueckner et al.

(10) Patent No.: US 12,731,586 B2
(45) Date of Patent: Sep. 8, 2026

(54) EMOTIONAL DETECTION AND PROCESSING FOR BARGE-IN SPEECH

(71) Applicant: Cerence Operating Company, Burlington, MA (US)

(72) Inventors: Raymond Brueckner, Ulm (DE); Daniel Mario Kindermann, Aachen (DE); Markus Funk, Ulm (DE)

(73) Assignee: Cerence Operating Company, Burlington, MA (US)

(*) Notice: Subject to any disclaimer, the term of this patent is extended or adjusted under 35 U.S.C. 154(b) by 762 days.

(21) Appl. No.: 17/846,401

(22) Filed: Jun. 22, 2022

(65) Prior Publication Data

US 2023/0419965 A1 Dec. 28, 2023

(51) Int. Cl.

| | |
|---|---|
| ***G10L 15/22*** | (2006.01) |
| ***B60Q 9/00*** | (2006.01) |
| ***G10L 15/26*** | (2006.01) |
| ***G10L 25/18*** | (2013.01) |
| ***G10L 25/63*** | (2013.01) |
| ***G10L 25/78*** | (2013.01) |

(52) U.S. Cl.

CPC .............. *G10L 15/222* (2013.01); *B60Q 9/00* (2013.01); *G10L 15/26* (2013.01); *G10L 25/18* (2013.01); *G10L 25/63* (2013.01); *G10L 25/78* (2013.01); *G10L 2015/223* (2013.01); *G10L 2015/227* (2013.01)

(58) Field of Classification Search

CPC ... G06F 16/2455; G06F 16/248; G10L 15/01; G10L 15/22; G10L 15/28; G10L 15/26; G10L 17/00; G10L 17/02; G10L 17/04; G10L 17/06

USPC .......................................................... 704/246

See application file for complete search history.

(56) References Cited

U.S. PATENT DOCUMENTS

| | | | | |
|---|---|---|---|---|
| 6,711,536 | B2 * | 3/2004 | Rees | G10L 15/04 704/E15.005 |
| 10,943,604 | B1 * | 3/2021 | Bone | G10L 17/04 |
| 2011/0295607 | A1 * | 12/2011 | Krishnan | G10L 17/26 704/E11.001 |
| 2014/0229175 | A1 * | 8/2014 | Fischer | G10L 15/22 704/235 |
| 2015/0254955 | A1 | 9/2015 | Fields et al. | |

(Continued)

FOREIGN PATENT DOCUMENTS

| | | | | |
|---|---|---|---|---|
| EP | 3057091 | A1 | 8/2016 | |
| WO | WO-0175555 | A2 * | 10/2001 | G06F 3/167 |

OTHER PUBLICATIONS

Kamaruddin et al., "Driver Behavior Analysis through Speech Emotion Understanding" Jun. 21-24, 2010 (Year: 2010).*

(Continued)

*Primary Examiner* — Richemond Dorvil

(74) *Attorney, Agent, or Firm* — Burr & Forman

(57) ABSTRACT

A method for managing an interaction between a user and a driver interaction system in a vehicle, the method comprising presenting a first audio output to a user from an output device of the driver interaction system, and, while presenting the first audio output to the user, receiving sensed input at the driver interaction system, processing the sensed input including determining an emotional content of the driver, and controlling the interaction based at least in part on the emotional content of the sensed input.

26 Claims, 5 Drawing Sheets

(56) References Cited

U.S. PATENT DOCUMENTS

| | | | | |
|---|---|---|---|---|
| 2019/0109878 | A1* | 4/2019 | Boyadjiev | G06N 5/022 |
| 2021/0295833 | A1* | 9/2021 | Rastrow | G10L 15/1815 |
| 2022/0147510 | A1* | 5/2022 | Singh | G06N 5/04 |

OTHER PUBLICATIONS

Automobile Driver Profiling—Infering Emotions Through Actions for safe driving (Year: 2016).*

Kleinschmidt et al., "Assessment of Speech Dialog Systems using Multi-Modal Cognitive Load Analysis and Driving Performance Metrics"; IEEE Xplore (Year: 2009).*

Michael Braun et al., "Affective Automotive User Interfaces—Reviewing the State of Emotion Regulation in the Car," arxiv.org, Cornell University Library, 201 Olin Library, Cornell University, Ithaca, NY 14853, pp. 1-25 (Mar. 30, 2020).

* cited by examiner

EMOTIONAL DETECTION AND PROCESSING FOR BARGE-IN SPEECH

BACKGROUND OF THE INVENTION

This invention relates to "barge-in" detection and analysis in a driver interaction system.

Driver interaction systems include in-vehicle voice assistants that perform tasks or services for drivers (and possibly passengers) based on commands received from the drivers. Generally, the driver provides commands to a voice assistant by speaking the commands or entering the commands through a user interface. For some commands, the voice assistant services the command and presents a verbal output to the driver.

A "barge-in" event occurs when the driver begins speaking during presentation of the verbal output. Some conventional voice assistants interrupt the voice assistant's presentation of the verbal output when a barge-in event is detected.

SUMMARY OF THE INVENTION

Some conventional approaches to handling barge-in events are prone to "false positives" because they can detect speech and interrupt the voice assistant even when the speaker did not intend for their speech to interrupt the voice assistant. Furthermore, many conventional approaches to handling barge-in events are unsophisticated in that they simply halt the interaction between the driver and the voice assistant without taking any corrective actions.

Aspects described herein relate to an approach to handling barge-in events that analyzes the content and nature the driver's speech (and possibly other variables) to infer an emotional state of the driver. That emotional state is then used to determine whether the verbal output of the voice assistant should be interrupted and, if so, how to modify the interaction between the driver and the voice assistant based on the inferred emotional state.

In one aspect, the invention features a method for managing an interaction between a user and a driver interaction system in a vehicle. The method may comprise presenting a first audio output to a user from an output device of the driver interaction system. The method may further comprise, while presenting the first audio output to the user, receiving sensed input at the driver interaction system, processing the sensed input, including determining an emotional content of the driver, and controlling the interaction based at least in part on the emotional content of the sensed input.

In a general aspect, a method for managing an interaction between a user and a driver interaction system in a vehicle includes presenting a first audio output to a user from an output device of the driver interaction system, while presenting the first audio output to the user, receiving sensed input at the driver interaction system, processing the sensed input including determining an emotional content of the driver, and controlling the interaction based at least in part on the emotional content of the sensed input.

Aspects may include one or more of the following features.

The sensed input may include spoken input. Processing the sensed input may include determining one or more words present in the spoken input. Processing the sensed input may include determining a presence of speech in the spoken input. The determining of the presence of speech in the spoken input may be based on one or more of a signal energy, a frequency content, and a periodicity of the spoken output. Determining the emotional content of the sensed input may include classifying features of the sensed input according to an emotion detector. The emotion detector may classify the features of the sensed input into a set of discrete emotion categories. The set of discrete emotion categories may include happy, anxious, angry, and irritated categories. Classifying the features of the sensed output by the emotion detector may include assigning scores for the sensed output to multiple emotions of a discrete set of emotions. The discrete set of emotions may include one or more of happy, anxious, angry, and irritated emotions.

Determining the emotional content of the sensed input may include processing the sensed input to determine a dimensional representation of the emotional content of the sensed input. The dimensional representation of the emotional content may include a multi-dimensional representation of the emotional content. A first dimension of the multi-dimensional representation of the emotional content may be a valence dimension and a second dimension of the multi-dimensional representation of the emotional content may be an arousal dimension. The dimensional representation of the emotional content may include a scalar representation of the emotional content in a substantially continuous range of scalar values corresponding to a range of emotions. Processing the spoken input may include determining one or more of a pitch and an amplitude of the spoken input.

Processing the spoken input further may include processing spectral features of the spoken input. The sensed input may include one or more of spoken input, camera input, force sensor input, physiological sensor input, radar sensor input, proximity sensor input, location information, and temperature input. Controlling the interaction may include aborting presentation of the first audio output according to the processing. Aborting the presentation according to the processing may include determining that the emotional content of the spoken input indicates a negative emotion toward the first audio output. The negative emotion may indicate a lack of understanding of the first audio input. Controlling the interaction may include determining a dialog state according to the processing and presenting a subsequent audio output based on the determined dialog state. Controlling the interaction may include continuing presentation of the first audio output based on a determination that the emotional content of the spoken input indicates a positive emotion toward the first audio output. The first audio output may include a spoken output. The driver interaction system may continuously receive for sensed input.

In another general aspect, a driver interaction system for interacting with a driver in a vehicle includes driver sensing components, including a microphone, wherein the driver sensing components sense sensed signals including speech signals, a speech detector, wherein the speech detector processes the sensed signals and generates output speech signals corresponding to speech from the driver, a speech recognizer, wherein the speech recognizer processes the sensed signals to generate a transcript of the speech signals, an emotion detector, wherein the emotion detector processes the sensed signals to generate a classified emotion of the driver, and a barge-in detector, wherein the barge-in detector processes any of the sensed signals, the output speech signals, the transcript, and the classified emotion to determine whether a barge-in event occurred.

In another general aspect, a non-transitory computer-readable medium has instructions stored thereon, the instructions, when executed by a processor of a driver interaction system, cause the driver interaction system to, as the driver interaction system outputs a first audio output to a driver, execute a first action, a second action, and a third action. The first action is that of receiving sensed input, the second action is that of processing the sensed input including determining an emotional content of the driver, and the third action is that of controlling an interaction with the driver based at least in part on the emotional content of the sensed input.

Other features and advantages of the invention are apparent from the following description, and from the claims.

DETAILED DESCRIPTION

1 Overview

Figure 1:
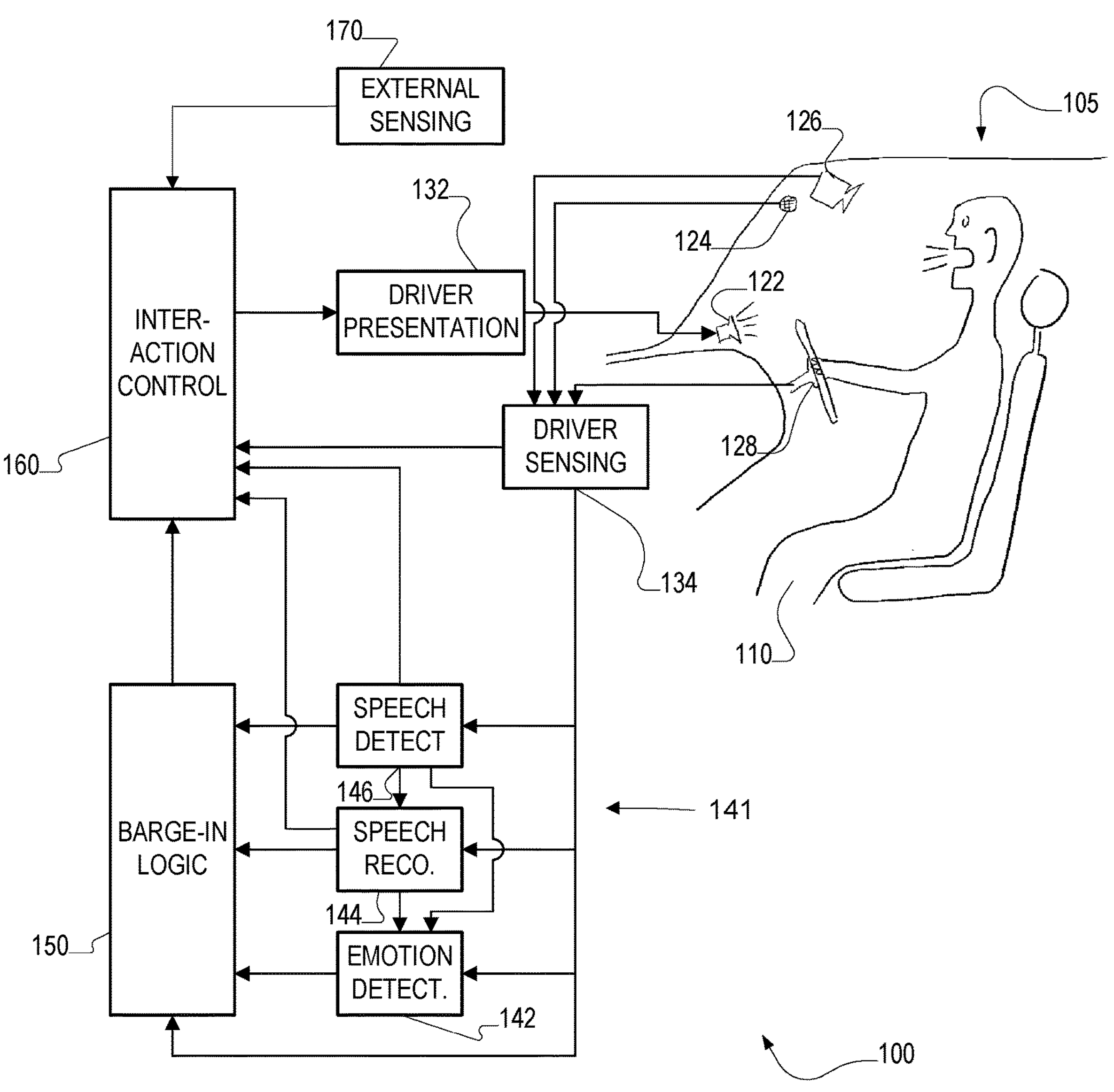
FIG. 1 is a schematic diagram of a driver interaction system.

Referring to FIG. 1, a driver interaction system 100 provides a communication interface to a driver 110 in a vehicle 105. At least one mode of communication with the driver is via an acoustic interface using a speaker 122 and a microphone 124 (or optionally a directional microphone array), for example, by providing spoken output to be heard by the driver 110 and receiving spoken input from the driver 110.

Very generally, the driver interaction system 100 communicates messages to the driver 110 such as route instructions or responses to the driver's verbal or otherwise input commands. In some examples, the driver 110 speaks during a communication by the driver interaction system 100 with the intention of interrupting communication, referred to herein as a "barge-in" event. A barge-in event may involve any number of expressions by the driver 110, such as a verbal request for clarification of a route instruction by the driver interaction system 100, or speech informing the driver interaction system 100 that it has misunderstood a past instruction by the driver 110. However, not all speech from the driver 110 (or from another person in the car) is a barge-in event intended to interrupt the communication. For example, detected speech coming from someone other than the driver 110 or coming from the driver 110 communicating with someone else in the car may not be intended to interrupt the driver interaction system 100. As is described in greater detail below, the driver interaction system 100 analyzes speech and other sensor and contextual data to infer an emotional state of the driver 110. The driver interaction system 100 uses the inferred emotional state to determine if and how to respond to the driver's speech.

The driver interaction system 100 includes a driver presentation component 132 and a driver sensing module 134. The driver presentation component 132 provides output to the driver 110, for example, synthesizing spoken output for presentation via the speaker 122, or providing video output via a screen. The driver sensing module 134 receives sensor data including a signal from the microphone 124. In some examples, the sensor data also includes one or both of a signal from a camera 126 and a signal from a stress sensor 128 in the steering wheel. For example, the camera 126 captures views of the driver's face that may aid in determining when the driver 110 is speaking (or even what they are saying), and as well as other characteristics as described further below. The stress sensor 128 measures characteristics such as the force with which the driver 110 is gripping the steering wheel. In some examples, the driver sensing module 134 also receives the signal provided to the speaker 122 to perform signal cancellation to remove as much of the output audio signal as possible from the microphone signal to provide a signal representing the driver's spoken output.

In operation in which there is no barge in and the system and the driver take "turns" providing output and speaking, respectively, the interaction control module 160 directs the interaction by processing inputs from the driver, which are received via the driver sensing module 134, and providing outputs via the driver presentation module 132.

To support barge-in features of the system, the driver sensing module 134 also outputs the sensed driver signals to a number of signal analysis modules 141, which are used to detect and/or characterize barge-in events. In general, the signal analysis modules 141 analyze the sensed signals and provide results of the analysis to a barge-in logic 150. The barge-in logic 150 processes the analysis results to determine whether a barge-in event has occurred as well as to characterize the barge-in event, for example, according to the emotional content of the driver's input. The output of the barge-in logic 150 is provided to an interaction control module 160, which processes the output of the barge-in logic 150 to determine how to control the interaction with the driver according to the driver's input.

In some examples, the signal analysis modules 141 include a speech detector 146, a speech recognizer 144, and an emotion detector 142. The speech detector 146 processes the sensed signals to determine if the driver 110 is speaking. A variety of approaches to speech detection may be used, for example, based on signal energy, frequency content and/or periodicity of the audio signal (i.e., after signal cancellation), and possibly considering time variation of such signal measures. In some examples, the camera 126 senses of the driver's lip motion and provides information that informs the speech detector 146 when the driver 110 is producing speech. In examples where driver speech characteristics are known, the speech detector 146 may distinguish driver input from other passenger input based on the speech characteristics. The speech detector 146 thereby processes the sensed audio and video signals to determine which audio signals of the sensed audio signals correspond to the driver's speech, and outputs an indication as to which audio signals (if any) correspond to the driver's speech to one or more of the speech recognizer 144, the emotion detector 142, and barge-in logic 150. The processing of the sensed audio signal can include determining a specific metric (e.g., pitch and/or amplitude). Alternatively, the processing can include processing of the raw audio waveform.

The speech recognizer 144 processes the sensor data to generate an automatic transcription of what the driver 110 has said. In some examples, the speech recognizer 144 is continually running and producing output transcription when it determines that speech is present, while in some other examples, the speech detector 146 triggers speech recognition. In certain versions, the speech recognizer 144 uses the indication from the speech detector 146 to construct a transcript corresponding to exclusively the driver's speech. The speech recognizer 144 outputs the transcript to the emotion detector 142, the barge-in logic 150, and the interaction control module 160.

The emotion detector 142 analyzes characteristics of the sensed signals produced by the driver 110 and characterizes the emotional content of the signals. For example, the emotion detector 142 classifies the signals as belonging to one or more a number of discrete emotion states. For example, such states may be "happy", "anxious", "angry", "irritated" etc. Alternatively, the emotion detector can provide a weighting of the emotional state, or some other categorical or non-categorical representation of the emotional content. Examples of non-categorical representations of the emotional content include numerical or dimensional (e.g., scalar or vector) representations of the emotional content. One example of a dimensional representation of the emotional content includes two-dimensional valence vs. arousal representation of the emotional content (where an emotion is represented as a vector in the two dimensional space). In another example, a continuous range of emotions is represented by a continuous range of scalar values (e.g., 0.0 to 1.0), where each value in the range represents a different emotion on a unit circle in the valence vs. arousal space (e.g., the unit circle in the valence vs. arousal space is mapped to a line with values 0.0 to 1.0).

The emotion detector 142 has available to it one or more of the sensed signals provided by the driver sensing module 134 and processed versions of those signals by the analysis modules 141. For example, the classifier has available to it audio of the user's speech, speech detection signals produced by the speech detector 146, speech transcription from the speech recognizer 144, video of the user's face, physical measurements such as the user's grip on the steering wheel, or in various alternatives, particular subsets of these signals. Examples of the user of such signals by the emotion detector 142 include use of driver's facial characteristics to contribute to the emotion classification, a tight grip indicating that the driver 110 is not "relaxed," and the transcript of the words spoken indicating emotional state of the driver.

Different approaches of emotion classification can be used by the emotion detector 142 in various implementations. Such approaches include knowledge- or rule-based (lexicon-based) approaches, machine-learning approaches (e.g., statistical methods or neural networks), and hybrid approaches that combine knowledge-based and machine learning methods. Machine-learning approaches may be configured through a "training" procedure that is performed prior to deploying the system and is used to determined values of configurable parameters of the emotion detector. For example, such parameters may be weights of neural networks, or parameters for use with statistical and/or probabilistic approaches. One approach to training makes use of a corpus of sensor signals (e.g., audio, video, grip) annotated with emotion labels. For example, the corpus may have a number of discrete inputs (e.g., utterances) each labeled with a corresponding emotional state. In some examples, the emotional state annotation may be a time-varying signal that characterizes variation in emotional state within utterances or continuous input. In some examples, the emotion detector processes features of the sensed signals to determine its output. In some examples, features of the sensed signals include a pitch and an amplitude of the sensed input. In other examples, the features can include segments of raw sensed data (e.g., a 10 ms duration audio segment) or spectral representations of raw sensed data data (e.g., spectrograms for a short time duration such as 10 ms).

In general, the emotion detector 142 is continually running (or at least while there is speech input provided by the driver) and producing an output classified emotion which it provides to the barge-in logic 150. In some alternative examples, the emotion detector 142 outputs a predicted emotion only when certain triggers are met. The output of the emotion detector 142 is provided to the barge-in logic 150.

The barge-in logic 150 receives as input the sensed signals, the classified emotion, the transcript, and the indication from the speech detector 146 and processes the inputs to determine (1) whether a barge-in event occurred, and (2) what characteristics are associated with that barge-in event. Using the sensed signals and the outputs of the signal analysis modules 141, the barge-in logic 150 determines when the driver's intention is to interrupt the ongoing communication being made by the driver presentation component 132 (i.e., whether a barge-in event occurred). Similarly, if the barge-in logic 150 determines characteristics of the barge-in event such as the emotion the driver 110 is expressing during the interruption, the volume of the driver's speech, the driver's tone, etc. The barge-in logic 150 outputs an indication of whether a barge-in event occurred along with at least some characteristics of the barge-in event (if such occurred) to the interaction control module 160.

When the interaction control module 160 is providing output to the driver (i.e., via the driver presentation module 160), and it receives an indication of a barge-in event from the barge-in module, it determines how to react to the barge-in event. While it is possible for the interaction control module to have a strict rule to interrupt presentation of output to the driver whenever it receives an indication of a barge-in event, more generally, the interaction controller implements more nuanced processing of the barge-in event. A non-limiting set of examples of how the interaction control module may be configured and responds to barge-in events is provided below.

In some examples, the information provided by the barge-in-logic 150 to the interaction control module 160 leads the interaction control module to conclude that the output to the driver 110 should stop. For example, this may be the case when the emotional content of the user indicates a degree of urgency, for example, as may be the case when the driver 110 has started to speak a new command, for example, correcting a misunderstanding of a previous command.

In some examples, the output from the barge-in logic 150 may indicating to the interaction control module that the driver 110 is providing confirmation feedback, in which case the output should continue.

In some examples, the output from the barge-in logic may have an emotional content indicating that the driver is impatient, in which case the interaction control module may determine to stop or abbreviate the output to the driver, while maintaining the state of the interaction with the driver. In some cases, such a determination may affect how the interaction control module provides further outputs (e.g., in long or abbreviated form).

In some examples, the interaction control module 160 also have available to it external sensing data from the external sensing module 170, for example, representing vehicle speed, location, turning or braking state, etc., and the manner in which it reacts to the barge-in event may depend on the external sensing data. For example, a spoken barge-in in conjunction with a grimace on the driver's face may relate to the vehicle's position indicating that a navigation turn has been missed, and therefore the barge-in event in conjunction with the vehicle's position may affect how the interaction control module further instructs the driver.

2 Example Scenarios

In general, interactions between the system and the driver 110 that follow a sequence of "turns." The interaction control module 160 causes an output to be presented to the driver 110 via the driver presentation component 132, typically in audio form via the speaker 122. After the presentation of the output, the driver 110 may, in certain situations provide a response or a command, for example, that is acquired by the microphone 124, passed through the driver sensing module 134, and provided to the interaction control module 160, which acts on the driver's response or command.

As is introduced above, in some examples, the driver 110 does not wait for his or her turn and "barges in" on the system's output (i.e., concurrent system output and driver input) by talking over the system's. A number of example scenarios in which a driver barges in and in which the system determines how to react to the barging in are provided below.

2.1 Example Scenario 1

Figure 2:
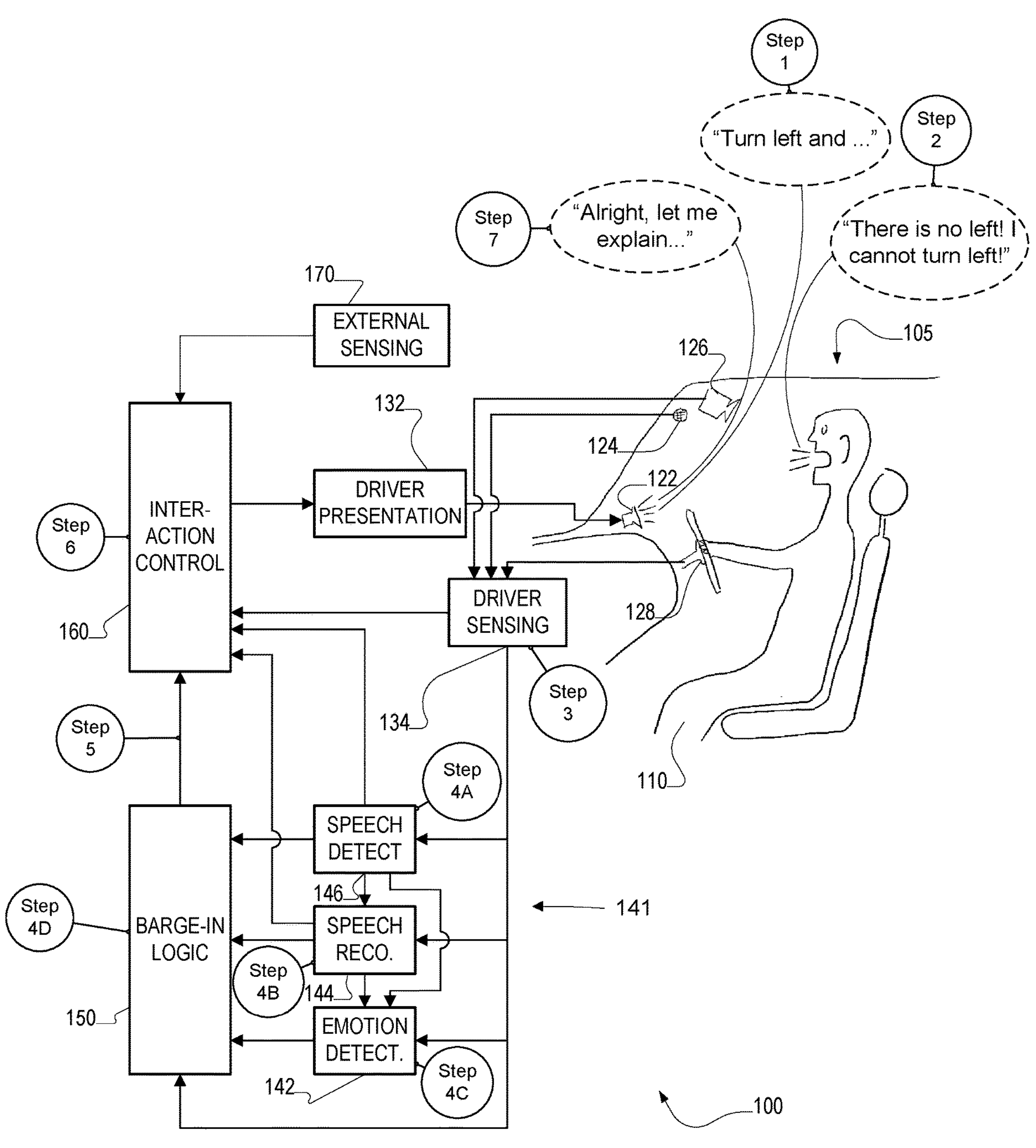
FIG. 2 is a schematic diagram of the driver interaction system of FIG. 1 in a first exemplary scenario.

Referring to FIG. 2, a first example scenario of a barge-in by the driver 110 is depicted with reference to a number of enumerated events that are depicted on the figure. These events, and similarly described events in subsequent figures, may be referred to as "steps" without implying that one step is completed before a next step begins. In this example, step 1 represents the interaction control module 160 causing the driver presentation component 132 to provide a navigation instruction by outputting an audio command "turn left and . . . ". The output of this instruction continues during steps described below, including in step 2, which represents the driver 110 talking over the output from the driver presentation component 132 by barging in by saying "there is no left! I cannot turn left!", for example, in surprise that there is nowhere to make the left turn that is being instructed. The driver 110 says this with a loud voice in an aggressive tone while tightly gripping the steering wheel. As described below, this driver input is detected by the driver interaction system 100 and the interaction control module 160 ultimately receives notice of and acts upon the barge-in.

In step 3, as the driver 110 is speaking, the microphone 124 captures an audio signal including the driver's speech, the camera 126 captures a video signal including the driver's face as they speak, and the stress sensor 128 captures a stress signal representing a strength of the driver's grip on the steering wheel. The audio signal, the video signal, and the stress signal are received and processed by the driver sensing module 134. The driver sensing module 134 outputs the sensed signals to the signal analysis modules 141 for subsequent processing.

Steps 4A-D represent processing of the output of the driver sensing module 134, which begins during the input from the driver 110 (i.e., they are concurrent with the driver's input, as well as with the output of the driver presentation component 132). In this example and in subsequently described example scenarios, the signals are processed on an ongoing basis while input is not expected by the interaction control module 160, and the signal analysis modules 141 in turn provide their output to the barge-in logic 150 (and, in some cases, as described below, each other).

Step 4A represents the speech detector 146 processing the sensed audio and video signals to output an indication to the barge-in logic 150 that the driver 110 is speaking. That is, the signal emitted from the speech detector 146 is an indicator that a speech signal, and, possibly and more particularly, a speech signal from the driver 110, has been detected.

Step 4B represents the speech recognizer 144 processing the sensed audio signals to output a transcript of detected speech (i.e., "there is no left! I cannot turn left!") to the barge-in logic 150 and the interaction control module 160 on an ongoing basis (e.g., outputting a partial transcript as the driver's speech is processed rather than waiting for the driver 110 to stop speaking). In some alternatives the speech recognizer 144 only processes the input after it receives a speech detection indicator from the speech detector 146.

Step 4C represents the emotion detector 142 processing the sensed driver signals from the driver sensing module 134 to produce an output to the barge-in logic 150 that represents the driver's emotional state as determined from the input. As with the speech detector 146 and speech recognizer 144, the emotion detector 142 provides an indication of the driver's emotional state on an ongoing basis, or alternatively, whenever it detects a change in that state. In this example, the emotion detector 142 classifies the driver's emotion as "angry," due to, in this example, the loud volume, harsh tone, and content of the driver's speech. In this example, the emotion detector 142 also has access to other signals, such as a measure of the driver's grip on the wheel, and the driver's facial expressions, and these other signals contribute to the emotion detector's outputs of the "angry" classification to the barge-in logic 150. In at least some examples, the emotion detector 142 receives the transcript from the speech recognizer 144 and/or the speech detection indicator from the speech detector 146 and uses these inputs in its decision to provide the "angry" classification.

In step 4D, the barge-in logic 150 receives and processes the ongoing outputs of the speech detector 146, speech recognizer 144, and emotion detector 142 to determine whether to provide an indication to the interaction control module 160 that there is a potential barge-in event from the driver 110, and if so, what attributes of the barge-in event are provided with the indication. In this example, the barge-in logic 150 makes a determination that a barge-in event occurred, and the barge-in logic 150 bases that determination on the "angry" classification, the transcript, and the sensed driver signals.

Step 5 represents emission of the barge-in indication from the barge-in logic 150 to the interaction control module 160 indicating that a barge-in event occurred. In this example, the barge-in indication contains characteristics including a volume of the driver's speech and the emotion of the driver 110. In some examples, the barge-in logic 150 emits subsequent indications during the driver's input, for example, as more of the input is transcribed or further emotion classification becomes available.

Step 6 represents the interaction control module 160 receiving and processing the indication including the volume and emotion characteristics emitted by the barge-in logic 150 The interaction control module 160 processes the indication, in this scenario determining that its attributes represent a situation in which the output (which is still ongoing) should be interrupted and that a new communication should be made. In this scenario in which the interaction control module 160 receives the indication while in the process of providing a navigation command, the interaction control module 160 concludes that the driver 110 either did not understand the command or could not carry out the command. To address its assessment of the situation in this scenario, step 7 represents the interaction control module 160 entering an explanation/clarification dialog instruction, which causes output via the driver presentation component 132 of a new prompt "alright, let me explain: the next turn is on the left in 450 feet at the next stop light." In this scenario, the interaction dialog proceeds, for example, with the interaction control module 160 providing successive navigation commands, for example, as it senses (e.g., via external sensing module 170) that the vehicle is proceeding along the planned route.

2.2 Example Scenario 2

Figure 3:
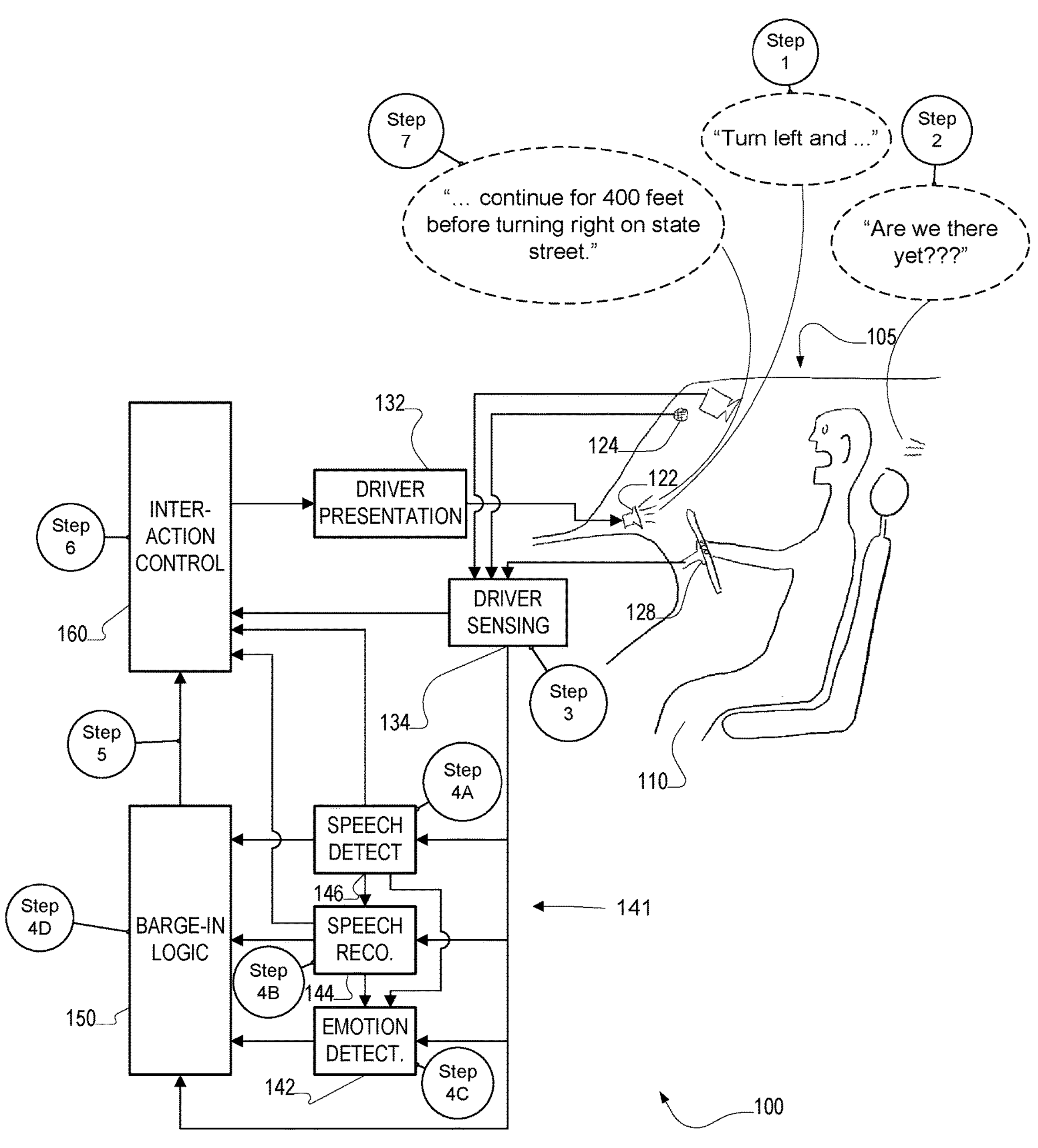
FIG. 3 is a schematic diagram of the driver interaction system of FIG. 1 in a second exemplary scenario.

Referring to FIG. 3, in a second example scenario, the driver interaction system 100 captures speech of a passenger and determines that no barge-in event has occurred. In this example, step 1 represents the interaction control module 160 causing the driver presentation component 132 to provide a navigation instruction by outputting an audio command "turn left and . . . ". The output of this instruction continues during steps described below, including in step 2, which represents a passenger talking over the output from the driver presentation component 132 by saying "are we there yet?" Meanwhile, the driver 110 maintains a neutral facial expression and does not change his or her grip on the steering wheel. As described below, this driver input is detected by the driver interaction system 100 and the interaction control module 160 ultimately receives notice of and acts upon the barge-in.

In step 3, as the passenger is speaking, the microphone 124 captures an audio signal including the passenger's speech, the camera 126 captures a video signal including the driver's facial expression, and the stress sensor 128 captures a stress signal representing a strength of the driver's grip on the steering wheel. The audio signal, the video signal, and the stress signal are received and possibly processed by the driver sensing module 134. The driver sensing module 134 outputs the sensor signals to the signal analysis modules 141 for subsequent processing.

Steps 4A-D begin during the input from the driver 110. Step 4A represents the speech detector 146 processing the sensed audio and video signals. The speech detector 146 outputs an indication, based on its processing of the sensed audio and video signals (as described above), that the sensed audio signals did not correspond to the driver's speech.

Step 4B represents the speech recognizer 144 processing the sensed audio signals, outputting a transcript of the detected speech to the barge-in logic 150. In this embodiment, the speech recognizer 144 processes the input only after it receives the (negative) speech detection indicator from the speech detector 146, which results in the speech recognizer 144 outputting a blank transcript to the barge-in logic 150 and the interaction control module 160.

Step 4C represents the emotion detector 142 processing the sensed driver signals from the driver sensing module 134 to classify the driver's emotion as "content" based on the driver's neutral facial expressions, the driver's lack of speech, and the driver's neutral stress signals.

Step 4D represents the barge-in logic 150 processing the outputs of the speech detector 146, speech recognizer 144, and emotion detector 142 to determine that a barge-in event did not occur. In this example, the barge-in logic 150 makes this determination based at least in part on the "content" classification and the speech detection indicator.

Step 5 represents the (as a result of the determination of a lack of barge-in event) emission from the barge-in logic 150 to the interaction control module 160 of an indication that a barge-in event has not occurred. In this scenario, since the barge-in logic 150 determined that a barge-in event did not occur, the barge-in indication does not contain further associated characteristics to the interaction control module 160.

Step 6 represents the interaction control module 160 receiving and processing any information received from the barge-in logic 150. In this example, the determination by the barge-in logic 150, and the associated emission from the barge-in logic 150 to the interaction control module 160, results in the interaction control module 160 continuing operation as if speech had never been detected. Step 7 thereby represents the interaction control module 160 entering a dialog instruction causing the driver presentation component 132 to continue, without pausing, its sentence from step 1 by saying " . . . continue for 400 feet before turning right at state street."

2.3 Example Scenario 3

Figure 4:
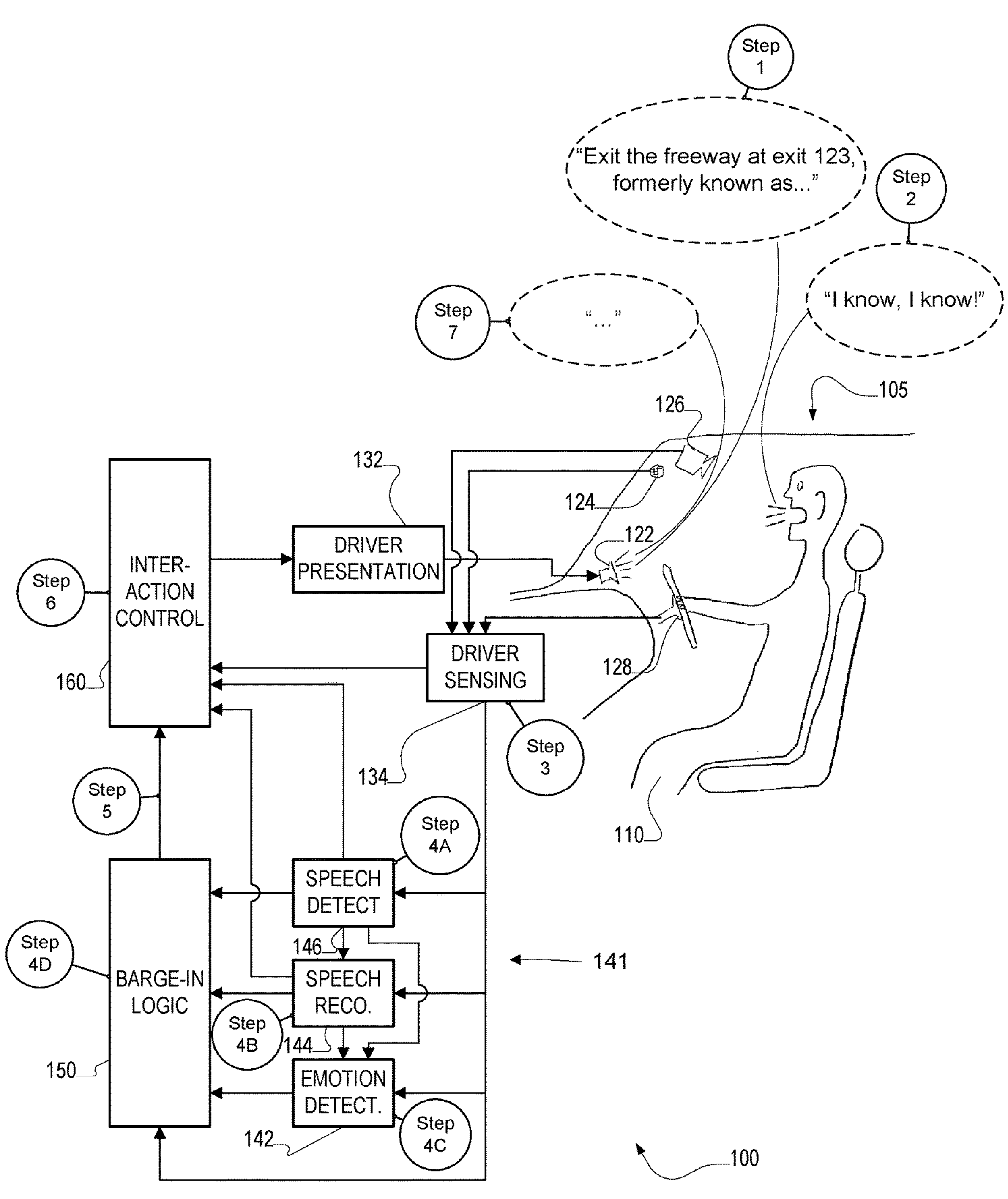
FIG. 4 is a schematic diagram of the driver interaction system of FIG. 1 in a third exemplary scenario.

Referring to FIG. 4, a third example of a barge-in by the driver 110 is depicted with reference to a number of enumerated events that are depicted on the figure. In this example, the first step represents the interaction control module 160 causing the driver presentation component 132 to provide a navigation instruction by outputting an audio command "exit the freeway at exit 123, formerly known as . . . ". The output of this instruction continues during steps described below, including in step 2, which represents the driver 110 talking over the output from the driver presentation component 132 by saying "I know, I know! . . . ", for example, in annoyance because the driver 110 knows the newer number of the exit and, as such, does not wish to be told its former exit number. The driver 110 says this in a loud voice with an exasperated tone. As described below, this driver input is detected by the driver interaction system 100 and the interaction control module 160 ultimately receives notice of and acts upon the barge-in.

In step 3, as the passenger is speaking, the microphone 124 captures an audio signal including the passenger's speech, the camera 126 captures a video signal including the driver's facial expression, and the stress sensor 128 captures a stress signal representing a strength of the driver's grip on the steering wheel. The audio signal, the video signal, and the stress signal are received and possibly processed by the driver sensing module 134. The driver sensing module 134 outputs the sensor signals to the signal analysis modules 141 for subsequent processing.

Steps 4A-D represent processing of the output of the driver sensing module 134, which begins during the input from the driver 110.

Step 4A represents the speech detector 146 processing the sensed audio and video signals to output an indication to the barge-in logic 150 that a speech signal is present. Step 4B represents the speech recognizer 144 processing the sensed audio signals to output a transcript of detected speech to the barge-in logic 150 (i.e., "I know, I know!"). Step 4C represents the emotion detector 142, as described above, processing the sensed driver signals from the driver sensing module 134 to classify the driver's emotion as "annoyed," due to, in this example, the driver's facial expressions, the driver's repeated statement, and the driver's loud voice and annoyed tone. Step 4D represents the barge-in logic 150 processing the ongoing outputs of the speech detector 146, speech recognizer 144, and the emotion detector 142 to determine that a barge-in event occurred. In this example, the barge-in logic 150 makes this determination based on the "annoyed" classification, the transcript, and the sensed driver signals.

Step 5 represents emission of the barge-in indication from the barge-in logic 150 to the interaction control module 160 that a barge-in event occurred. The emitted barge-in indication sent to the interaction control module 160 contains characteristics including the (loud) volume of the driver's speech and the (annoyed) emotion of the driver 110.

Step 6 represents the interaction control module 160 receiving and processing the indication sent from the barge-in logic 150 along with associated attributes. The interaction control module 160 processes the indication, in this scenario determining that its attributes represent a situation in which the output (which is still ongoing) should be interrupted. In this scenario in which the interaction control module 160 was in the process of providing a navigation command, the interaction control module 160 concludes that the driver 110 no longer wishes to hear, in this and subsequent driver instructions, what a newly re-named exit's former name was. To address its assessment of the situation in this scenario, step 7 represents the interaction control module 160 entering a cessation of dialog instruction, causing the driver presentation component 132 to cease its current output (i.e., the ongoing message in step 1 which the driver 110 interrupted in step 2). In this scenario, the interaction dialog proceeds, for example, with the interaction control module 160 providing successive navigation commands which, for example, do not contain former exit names.

2.4 Example Scenario 4

Figure 5:
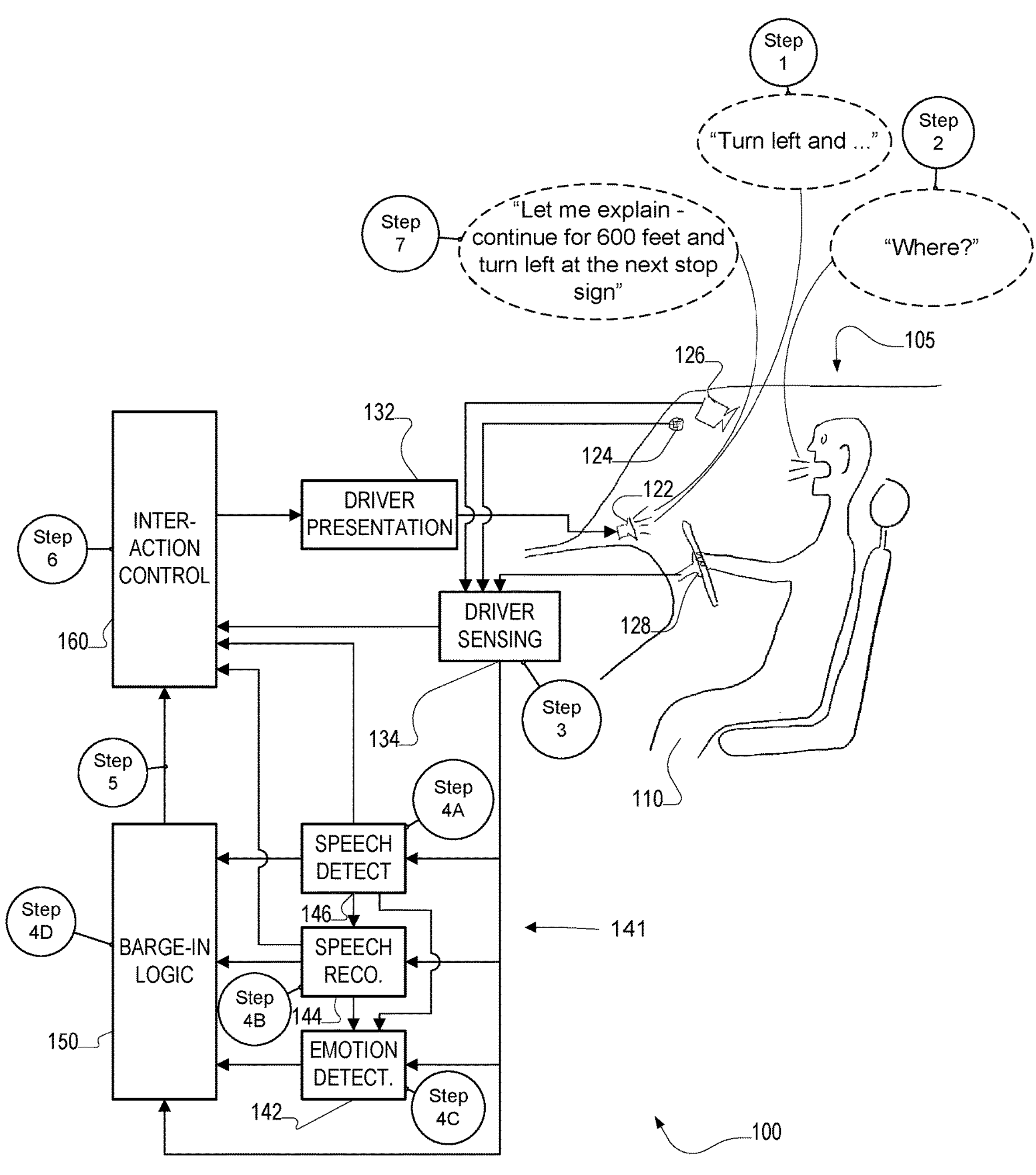
FIG. 5 is a schematic diagram of the driver interaction system of FIG. 1 in a fourth exemplary scenario.

Referring to FIG. 5, a fourth example scenario of a barge-in by the driver 110 is depicted with reference to a number of enumerated events that are depicted on the figure. In this example, the first step represents the interaction control module 160 causing the driver presentation component 132 to provide a navigation instruction by outputting an audio command "turn left and . . . ". The output of this instruction continues during steps described below, including in step 2, which represents the driver 110 talking over the output from the driver presentation component 132 by saying "where? . . . ", for example, in confusion about where specifically the driver 110 is being instructed to turn. The driver 110 says this with a normal-volume voice and neutral tone. As described below, this driver input is detected by the driver interaction system 100 and the interaction control module 160 ultimately receives notice of and acts upon the barge-in.

In step 3, as the passenger is speaking, the microphone 124 captures an audio signal including the passenger's speech, the camera 126 captures a video signal including the driver's facial expression, and the stress sensor 128 captures a stress signal representing a strength of the driver's grip on the steering wheel. The audio signal, the video signal, and the stress signal are received and possibly processed by the driver sensing module 134. The driver sensing module 134 outputs the sensor signals to the signal analysis modules 141 for subsequent processing.

Steps 4A-D represent processing of the output of the driver sensing module 134, which begins during the input from the driver 110. Step 4A represents the speech detector 146 processing the sensed audio and video signals. The speech detector 146 outputs an indication to the barge-in logic 150 that a speech signal is present. Step 4B represents the speech recognizer 144 processing the sensed audio signals to output a transcript of detected speech to the barge-in logic 150 and the interaction control module 160 on an ongoing basis. Step 4C represents the emotion detector 142 processing the sensed driver signals from the driver sensing module 134 to produce an output to the barge-in logic 150 that represents the driver's emotional state as determined from the input. In this example, the emotion detector 142 classifies the driver's emotion as "confused," due to, in this example, the volume, tone, and content of the driver's speech. Step 4D represents the barge-in logic 150 processing the ongoing outputs of the speech detector 146, speech recognizer 144, and the emotion detector 142 to determine that a barge-in event occurred. In this example, the barge-in logic 150 makes this determination based on the "confused" classification, the transcript, and the sensed driver signals.

Step 5 represents emission of the barge-in indication from the barge-in logic 150 to the interaction control module 160 that a barge-in event occurred. The emitted barge-in indication sent to the interaction control module 160 contains characteristics including the (normal) volume of the driver's speech and the (confused) emotion of the driver 110.

Step 6 represents the interaction control module 160 receiving and processing the indication sent from the barge-in logic 150 along with associated attributes. The interaction control module 160 processes the indication, in this scenario determining that its attributes represent a situation in which the output (which is still ongoing) should be interrupted. In this scenario in which the interaction control module 160 was in the process of providing a navigation command, the interaction control module 160 concludes that the driver 110 requires more information about the next turn than what was previously conveyed.

To address its assessment of the situation in this scenario, step 7 represents the interaction control logic 160 entering an explanation/clarification dialog instruction, causing output via the driver presentation component 132 of a new prompt "let me explain—continue for 600 feet and turn left at the next stop sign." In this scenario, the interaction dialog proceeds, for example, with the interaction control module 160 providing successive navigation commands which, for example, contain former exit names. In further examples, wherein the emotion detector 142 determines the driver 110 is instead, e.g., panicked, the interaction control module 160 may instead provide successive navigation commands which, for example, are designed to calm the driver 110.

3 Alternatives

In the examples described above, the emotion detector is described as generating a single predicted emotion as output. In other examples, the emotion detector may instead generate a weighted set of emotions (e.g., [("angry," 0.5), ("happy, 0.0"), ("confused," 0.2), . . . ]). Such a weighted set may provide a more detailed picture of the emotional state of the driver, resulting in improved barge-in detection. Similarly, the barge-in logic 150 may, in some examples, generate a binary output indicating whether a barge-in event occurred (i.e., yes or no), but the barge-in logic 150 may also, in other examples, generate a weighted output indicating a confidence interval of whether or not a barge-in event occurred.

In other examples, the emotional content is represented using other dimensional models of emotion (e.g., the PANA model or the PAD emotional state model), such as pleasure, dominance, positive-negative, and others. In some examples, scoring systems corresponding to other dimensional models of emotion or other methods or models of emotional classification may be used to determine an emotional state of the driver. A number of different types of sensors are described above, but it is noted that any other types of sensors suitable for barge-in detection purposes may be used. For example, motion sensors, temperature sensors, vibration sensors, humidity sensors, photo optic sensors, etc. may all be used to sense the driver for use by the barge-in logic. In some examples, physiological sensors are used to measure physiological input signals, such as force sensors, pressure sensors, skin conductance sensors, heartrate or electrocardiography sensors, brainwave sensors, and any other type of sensor suitable for detecting physiological processes.

In all the examples above, the driver is speaking as part of causing a barge-in event. However, in some examples, sensor data such as the camera signal and the stress signal from the steering wheel sensor can be used without any voice input to cause a barge-in event. For example, if the driver is grimacing and tightly clutching the wheel, there may be a barge-in event.

In some examples, the system may make use of external information beyond mere sensing of the driver and may instead relate to the situation or context of an interaction with the driver, such as information derived from the driver's calendar, weather information, traffic information, and others.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing an interaction between a user and a driver-interaction system in a vehicle, the method comprising:

presenting a first audio output to a user from an output device of the driver-interaction system, and while presenting the first audio output to the user, receiving sensed input at the driver-interaction system, processing the sensed input, wherein processing the sensed input comprises determining whether the sensed input includes speech of the driver defining a barge-in event, and determining an emotional content of the driver from the speech of the driver, and controlling the interaction based at least in part on the emotional content responsive to the sensed input being determined to include speech of the driver defining the barge-in event.

2. The method of claim 1, wherein controlling the interaction includes aborting presentation of the first audio output according to the processing, determining a dialog state according to the processing, and presenting a subsequent audio output based on the determined dialog state.

3. The method of claim 1, wherein the sensed input comprises spoken input and wherein processing the sensed input comprises determining an amplitude of the spoken input.

4. The method of claim 1, wherein processing the sensed input comprises determining the presence of speech in the sensed input based on frequency content of the sensed input.

5. The method of claim 1, wherein determining the emotional content of the sensed input includes classifying features of the sensed input using an emotion detector.

6. The method of claim 1, wherein determining the emotional content of the sensed input comprises classifying features of the sensed input into discrete emotion categories.

7. The method of claim 1, wherein determining emotion content of the sensed input comprises classifying the features of the sensed output into emotions from a discrete set of emotions and assigning scores to each of the emotions.

8. The method of claim 1, wherein determining emotion content of the sensed input comprises assigning scores to each emotion in a discrete set of emotions.

9. The method of claim 1, wherein the sensed input is a barge-in event and wherein the barge-in event occurs when the driver begins speaking during presentation of the first audio output by the driver-interaction system, wherein the first audio output comprises a first verbal output.

10. The method of claim 1, wherein processing the sensed input comprises determining the presence of speech in the sensed input based on periodicity of the sensed input.

11. The method of claim 1, wherein processing the sensed input comprises determining the presence of speech in the sensed input based on energy of the sensed input.

12. The method of claim 1, wherein determining the emotional content of the sensed input includes processing the sensed input to determine a dimensional representation of the emotional content of the sensed input and wherein the dimensional representation of the emotional content includes a scalar representation of the emotional content in a substantially continuous range of scalar values corresponding to a range of emotions.

13. The method of claim 1, wherein the sensed input comprises spoken input and wherein processing the sensed input comprises determining a pitch of the spoken input.

14. The method of claim 1, wherein the sensed input comprises spoken input and wherein processing the sensed input comprises processing spectral features of the spoken input.

15. The method of claim 1, wherein the sensed input includes one or more of camera input, physiological sensor input, radar sensor input, proximity sensor input, location information, and temperature input.

16. The method of claim 1, wherein controlling the interaction includes aborting presentation of the first audio output in response to having determined that the emotional content of the spoken input indicates a negative emotion toward the first audio output.

17. The method of claim 1, wherein controlling the interaction includes aborting presentation of the first audio output according to the processing, wherein aborting the presentation is carried out in response to determining that the emotional content of the spoken input indicates a lack of understanding of the first audio input.

18. The method of claim 1, wherein controlling the interaction includes continuing presentation of the first audio output based on a determination that the emotional content of the spoken input indicates a positive emotion toward the first audio output.

19. The method of claim 1, wherein controlling the interaction includes aborting presentation of the first audio output in response to having detected a negative emotion towards the first audio output in said sensed input, said sensed input being a barge-in event that occurred when the driver began speaking during the first audio output.

20. The method of claim 1, wherein the driver-interaction system constantly senses for sensed input.

21. The method of claim 1, wherein controlling the interaction comprises determining that presentation of the first audio output is to continue notwithstanding having received the sensed input.

22. The method of claim 1, wherein the sensed input is a first sensed input, wherein the emotional content is a first emotional content, wherein the method further comprises, based on the first emotional content, aborting the presentation of the first audio output, after having aborted presentation of the first audio output, presenting a second audio output to the user, and while presenting the second audio output to the user, receiving a second sensed input at the driver-interaction system and processing the second sensed input, wherein processing the second sensed input comprises determining a second emotional content of the driver based on the second sensed input and, based on the second emotional content, continuing presentation of the second audio output.

23. A driver-interaction system for interacting with a driver in a vehicle, the driver-interaction system comprising:

a microphone that senses sensed signals from the driver, wherein the sensed signals includes speech;

an output device through which the driver-interaction system presents audio output to the driver;

a speech detector, wherein the speech detector processes the sensed signals and generates output speech signals corresponding to speech from the driver;

a speech recognizer, wherein the speech recognizer processes the sensed signals to generate a transcript of the speech signals;

an emotion detector, wherein the emotion detector processes the sensed signals to generate a classified emotion of the driver; and a barge-in detector, wherein, while the driver-interaction system is presenting audio output to the driver, the barge-in detector carries out processing steps to determine that a barge-in event has occurred involving speech of the driver and to determine whether or not to interrupt the audio output being presented in response to the barge-in event based on the classified emotion of the driver determined from the speech of the driver defining the barge-in event, wherein the processing steps carried out by the barge-in detector rely on one or more of: the sensed signals, the output speech signals, the transcript, and the classified emotion.

24. The driver-interaction system of claim 23, further comprising an interaction-control module that is configured for controlling an interaction with the driver by determining a dialog state based on processing carried out by one or more of the barge-in detector, the driver-sensing components, the speech detector, and the speech recognizer and presenting a subsequent audio output to the driver based on the determined dialog state.

25. The driver-interaction system of claim 23, wherein the barge-in event occurs when the driver begins speaking during presentation of the verbal output by the driver-interaction system.

26. A non-transitory computer-readable medium having instructions stored thereon, the instructions, when executed by a processor of a driver-interaction system, cause the driver-interaction system to, as the driver-interaction system outputs a first audio output to a driver, execute a first action, a second action, and a third action, wherein: the first action is that of receiving sensed input; the second action is that of processing the sensed input including determining whether the sensed input includes speech of the driver defining a barge-in event, and determining an emotional content of the driver from the speech of the driver, and the third action is that of controlling an interaction with the driver based at least in part on the emotional content of the sensed input responsive to the sensed input being determined to include speech of the driver defining the barge-in event.

* * * * *